United States Patent
Ponzio et al.

(10) Patent No.: US 10,804,775 B2
(45) Date of Patent: Oct. 13, 2020

(54) METHOD FOR PRODUCING STATORS OF DYNAMO ELECTRIC MACHINES FORMED FROM AN ASSEMBLY OF POLE SEGMENTS

(71) Applicant: ATOP S.p.A., Barberino Val d'Elsa, Florence (IT)

(72) Inventors: Massimo Ponzio, Florence (IT); Rubino Corbinelli, Siena (IT); Stefano Niccolini, Siena (IT)

(73) Assignee: ATOP S.p.A., Barberino Val d'Elsa (IT)

( * ) Notice: Subject to any disclaimer, the term of this patent is extended or adjusted under 35 U.S.C. 154(b) by 140 days.

(21) Appl. No.: 16/030,010

(22) Filed: Jul. 9, 2018

(65) Prior Publication Data
US 2018/0316251 A1    Nov. 1, 2018

Related U.S. Application Data (62) Division of application No. 14/764,883, filed as application No. PCT/IB2014/059788 on Mar. 14, 2014, now Pat. No. 10,050,498.

(30) Foreign Application Priority Data

Mar. 20, 2013    (IT) ................ PI2013A0020

(51) Int. Cl.
*H02K 15/02*    (2006.01)
*H02K 1/14*    (2006.01)

(52) U.S. Cl.
CPC ........... *H02K 15/022* (2013.01); *H02K 1/148* (2013.01); *Y10T 29/49011* (2015.01); *Y10T 29/53143* (2015.01); *Y10T 29/53161* (2015.01)

(58) Field of Classification Search
CPC .. A61B 10/0064; H02K 15/022; H02K 1/148; Y10T 29/49011; Y10T 29/53143; Y10T 29/53161
See application file for complete search history.

(56) References Cited

U.S. PATENT DOCUMENTS

| 4,416,058 A | 11/1983 | Henry et al. |
| 4,658,492 A | 4/1987 | Kieffer et al. |

(Continued)

FOREIGN PATENT DOCUMENTS

| EP | 1 331 719 | 7/2003 |
| WO | WO2004/105218 | 12/2004 |

OTHER PUBLICATIONS

Search Report dated Feb. 13, 2014 for PI2013A000020.
International Search Report dated Jul. 8, 2014 for PCT/IB2014/059788.

*Primary Examiner* — Minh N Trinh
(74) *Attorney, Agent, or Firm* — Haley Guiliano LLP; Jason S. Ingerman (57) ABSTRACT

A method for manufacturing stators of dynamoelectric machines, the stators being formed as an assembly of pole segments; the apparatus comprising a seat where the assembly of pole segments are seated. An engagement assembly engages first ends of the pole segments for translation of the pole segments from the seat to a transfer device. A first holding assembly comprises a first plurality of holding members for clamping the pole segments to hold the pole segments as an assembly of pole segments. The first holding assembly being arranged on the transfer device moveable to transfer the assembly of pole segments from a first position to a second position. A containing assembly is located at the second position and provided with a second plurality of holding members for holding the assembly of pole segments. The second plurality of holding members are positioned on the containing assembly to surround the assembly of pole segments that are located at the containing assembly.

9 Claims, 10 Drawing Sheets

(56) References Cited

U.S. PATENT DOCUMENTS

| | | | |
|---|---|---|---|
| 4,723,354 A | | 2/1988 | Moser |
| 5,186,405 A | | 2/1993 | Beakes et al. |
| 5,549,253 A | | 8/1996 | Beakes et al. |
| 5,658,477 A | | 8/1997 | Kirker et al. |
| 5,781,988 A | | 7/1998 | Faraoni et al. |
| 6,092,276 A | * | 7/2000 | Beakes .............. H02K 15/0056 29/596 |
| 6,616,082 B2 | * | 9/2003 | Burch .................. H02K 15/085 242/432.4 |
| 7,243,874 B2 | | 7/2007 | Becherucci et al. |
| 7,380,335 B2 | * | 6/2008 | Hashimoto ........ H02K 15/0457 140/92.1 |
| 9,479,033 B2 | | 10/2016 | Ponzio et al. |
| 10,050,498 B2 | * | 8/2018 | Ponzio ................ H02K 15/022 |
| 2002/0020778 A1 | | 2/2002 | Stratico et al. |
| 2015/0372570 A1 | | 12/2015 | Ponzio et al. |

\* cited by examiner

METHOD FOR PRODUCING STATORS OF DYNAMO ELECTRIC MACHINES FORMED FROM AN ASSEMBLY OF POLE SEGMENTS

CROSS-REFERENCE TO RELATED APPLICATIONS

This is a division of U.S. patent application Ser. No. 14/764,883 (now U.S. Pat. No. 10,050,498), filed Jul. 30, 2015 as the United States National Stage of International Patent Application No. PCT/IB2014/059788, filed Mar. 14, 2014, each of which is hereby incorporated herein by reference in its respective entirety.

FIELD OF THE INVENTION

The present invention relates to the production of stators formed from segments of single poles in the following referred to as pole segments.

In particular, the solutions foreseen by the present invention relate to the assembly of pole segments for forming a wound stator.

BACKGROUND OF THE INVENTION

As known, each pole segment can be wound singularly with one or more electric conductors (in the following also referred to as wire).

The sequence of operations by which the pole segments are produced normally provides winding the pole segments singularly, assembly of the pole segments to form the stator, connecting of the leads of the pole segments to terminals, fusing of leads of the pole segments to the terminals and definite joining of the pole segments by using external binding.

An advantage of a stator formed from the pole segments consists in the increase of the quantity of electric conductor that can be present in the finished stator. Consequently, a stator formed from pole segments of is capable of producing higher performance for the same sizing of the final stator.

The existing production lines of stators formed from pole segments are scarcely automatic.

The few stages that are automatic adopt general purpose robots, which have high costs and long production time. In this situation, a high number of these devices are required to work in parallel in order to reach the required production quantities.

Furthermore, for the operations which follow winding of the pole segments, the latter need to be assembled together in a joining situation that is not final. In this situation there is a high risk of disjoining, or incorrect positioning of the pole segments during the successive work stages, which contemplate for example: transferring, termination of the coil leads, fusing of the leads to the terminals, quality inspection, definite joining of the pole segments together. Examples of solutions for producing of stators formed from pole segments have been described in EP 1098425 and EP 1629588.

SUMMARY OF THE INVENTION

It is an object of the present invention to provide an apparatus and a method for assembling pole segments with a high degree of automation.

It is also an object of the present invention to provide an apparatus and a method capable of accomplishing transfer of an assembly of pole segments maintaining the positioning accuracy of the pole segments.

It is a further object of the present invention to provide an apparatus and a method for winding and assembling the pole segments where the apparatus occupies reduced plan space in the production environment of components having wound cores.

It is also another object of the present invention to provide an apparatus and a method for positioning an assembly of pole segments accurately for being worked on.

It is also a further object of the invention to provide an apparatus and a method for transferring and working an assembly of pole segments, which has a lead support member.

These and other aspects of the invention can be accomplished with an apparatus for producing stators of dynamoelectric machines formed from an assembly of pole segments as defined by claim 1.

According to a further aspect of the invention a method for producing stators of dynamoelectric machines formed from an assembly of pole segments as defined by claim 17.

Further characteristics of the invention are indicated in the dependent claims.

BRIEF DESCRIPTION OF THE DRAWINGS

The invention will be now shown with the following description of exemplary embodiments thereof, exemplifying but not limitative, with reference to the attached drawings in which.

DETAILED DESCRIPTION OF SOME EXEMPLARY EMBODIMENTS

Figure 1:
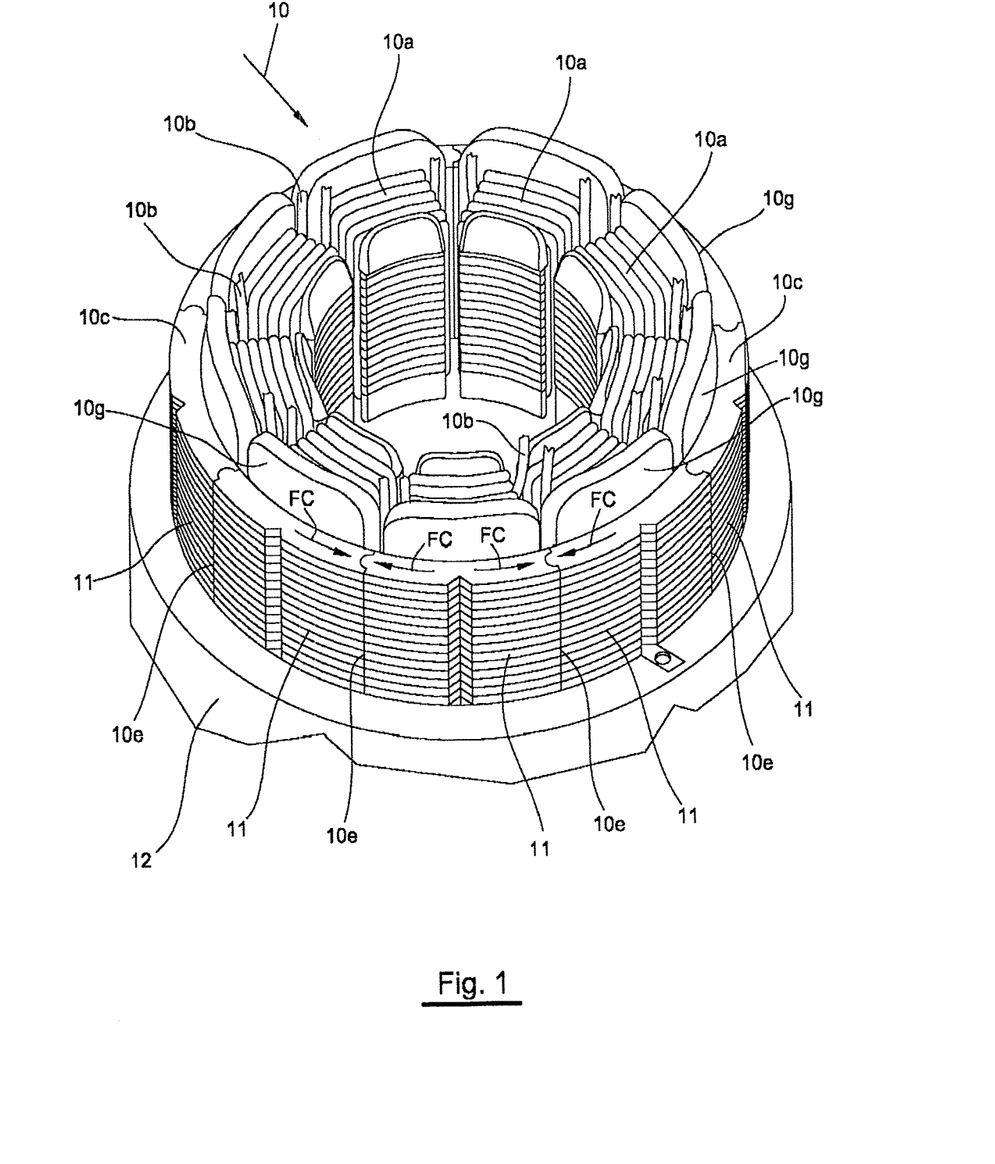
FIG. 1 is a perspective view of a stator of a dynamoelectric machine formed from pole segments that have been wound and assembled.

FIG. 1 shows a stator core 10 in a processing condition formed from an assembly of pole segments 11, like those described for example in EP 1,098,425. The pole segments 11 have been wound with coils 10a by means of flyer devices, or other dispensing devices. Leads 10b are extensions of the conductor wire used to wind the coils and need to be routed on predetermined paths and connected to terminals (not shown in FIG. 1), which are normally present on the insulation members 10g of the ends 10c and 10d of the pole segments 11.

As an alternative, the terminals can be present on a support member for the leads 10b placed on an end of the pole segments. An example of a support member for the leads 10b of this type is shown and more fully described in the following.

Continuous lines 10e visible in FIG. 1 represent the lateral sides of the pole segments 11. In particular, a pole segment 11 is delimited by the two axial ends 10c and 10d, and two lateral sides 10e. In the figures, ends 10c and 10d correspond to the end faces of the lamination stacks that form the pole segments 11.

Still as shown in FIG. 1, the pole segments 11 are assembled together to achieve a mutual engagement along the lateral sides 10e.

More in detail, the mutual engagement between the pole segments can occur by means of protrusions present on one lateral side 10e, which engage in respective recesses of an adjacent lateral side of a pole segment, like is schematically shown in FIG. 1. The pole segments 11 can be maintained in a temporary assembled condition by generating circumferential force reactions FC to keep the male protrusions positioned in the recesses.

Figures 2, 2A:
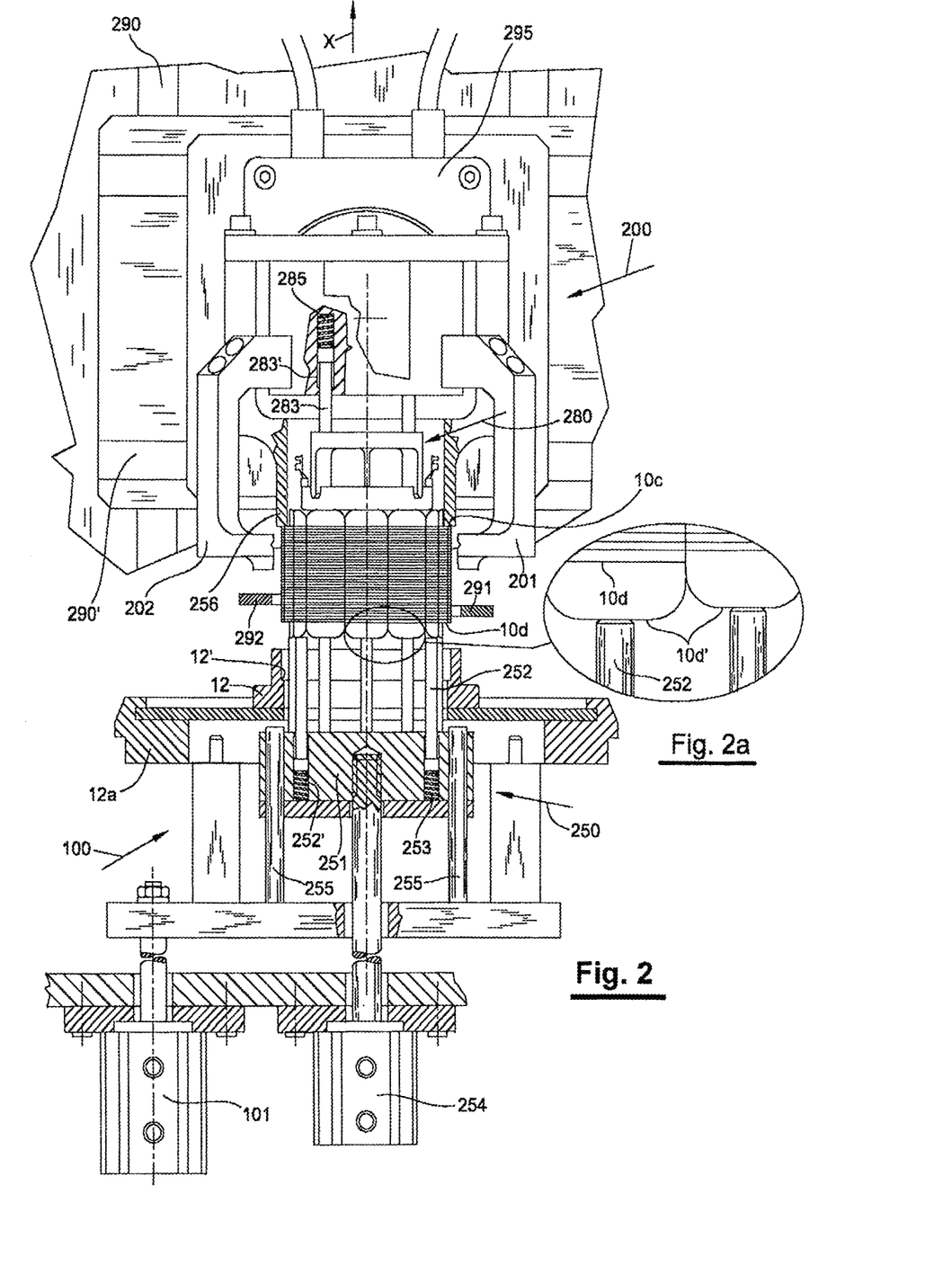
FIG. 2 is a partial section view illustrating a transfer device of an assembly of pole segments according to the principles of the invention.
FIG. 2*a* is an enlargement of a portion of FIG. 2.

FIGS. 1 and 2 show a situation in which the pole segments 11 form a stator positioned in a hollow seat 12. Seat 12 contains a portion of the lengths of the pole segments 11, as shown in FIG. 1. In FIG. 1, seat 12 hides the view of ends 10d. However, from FIG. 2, even though the poles are shown in raised position, it can be assumed that the pole segments can be seated in seat 12 by engaging ends 10d against rim 12' of the seat. Seat 12 guarantees that the lateral sides 10e are correctly aligned to form the assembly, and that the pole segments 11 remain in this condition in successive operations. The pole segments 11 are seated in seat 12 during a preliminary operation, which can be achieved by positioning of a robot, or manually by an operator.

FIG. 2 illustrates an embodiment of the present invention for transferring an assembly of the pole segments 11 from the seat 12 to a transfer device 200.

In the case shown in FIG. 2, the seat 12 is provided on a transport pallet 12a, which has been conveyed, for example, by a belt conveyor (not shown in the figure) to the location of FIG. 2. The pallet 12a and the seat 12 are raised towards the transfer device 200 by lifting device 100, which is driven by linear actuator 101.

In other embodiments, seat 12 can be one of a plurality of seats like 12 fixed to a continuous conveyor which is moved to align in succession each seat 12 in the position shown in FIG. 2. Seat 12 can also be part of another device that maintains seat 12 aligned in the position of FIG. 2.

A base 251 belonging to an engagement assembly 250 is foreseen having engagement members 252 in the form of rods (see also FIG. 2a). Engagement members 252 can be present in a number equal to the number of pole segments that are present in seat 12. FIG. 2 illustrates a situation where seat 12 has been previously aligned with engagement members 252 so that each pole segment 11 results aligned with a respective engagement member 252.

Each engagement member 252 has a portion positioned in a respective seat 252' of base 251. A spring 253 in each seat 252' guarantees that each engagement member 252 has a degree of free movement with respect to base 251 in the direction X, i.e. along the direction used for lifting seat 12, or more generally along a direction that faces transfer device 200.

Base 251 can be assembled on guides 255 and moved in a guided manner in direction X by means of linear actuator 254 connected to base 251. This solution guarantees accurate movement of engagement members 252 in direction X so that each engagement member 252 engages a respective pole segment 11 at an end 10d' of the insulation members 10g, and thereby moves the pole segment 11 towards transfer device 200, see also the enlargement of FIG. 2a where engagement members 252 are shown engaging the insulation ends 10d' of the pole segments 11.

The movement of engagement members 252 can be terminated when base member 251 has accomplished a predetermined stroke in direction X, which brings ends 10c of pole segments 11 in abutment against a reference surface of an engagement ring 256. The predetermined stroke is chosen to guarantee abutment of all the pole segments 11 against the above mentioned reference surface of engagement ring 256, which thus represents a reference surface (see the condition of FIG. 2). This abutment occurs even if the pole segments are longer or shorter with respect to each other, within a predetermined tolerance range. This is possible due to the presence of springs 253 which produce required compensation motion of engagement members 252 with respect to base member 251.

The difference in length of the pole segments 11 can be due to tolerance variations in the lamination thickness, or other reasons related to the stage of forming the laminations stacks.

As a result of the abutment with engagement ring 256, all the pole segments 11 are aligned along a common reference surface defined by ends 10c. This stage of referencing the pole segments 11 is necessary for successive accurate positioning and processing of the pole segments 11, as will more fully described in the following.

Other embodiments for accomplishing the stage of referencing the pole segments 11 are described in the following.

Figure 3:
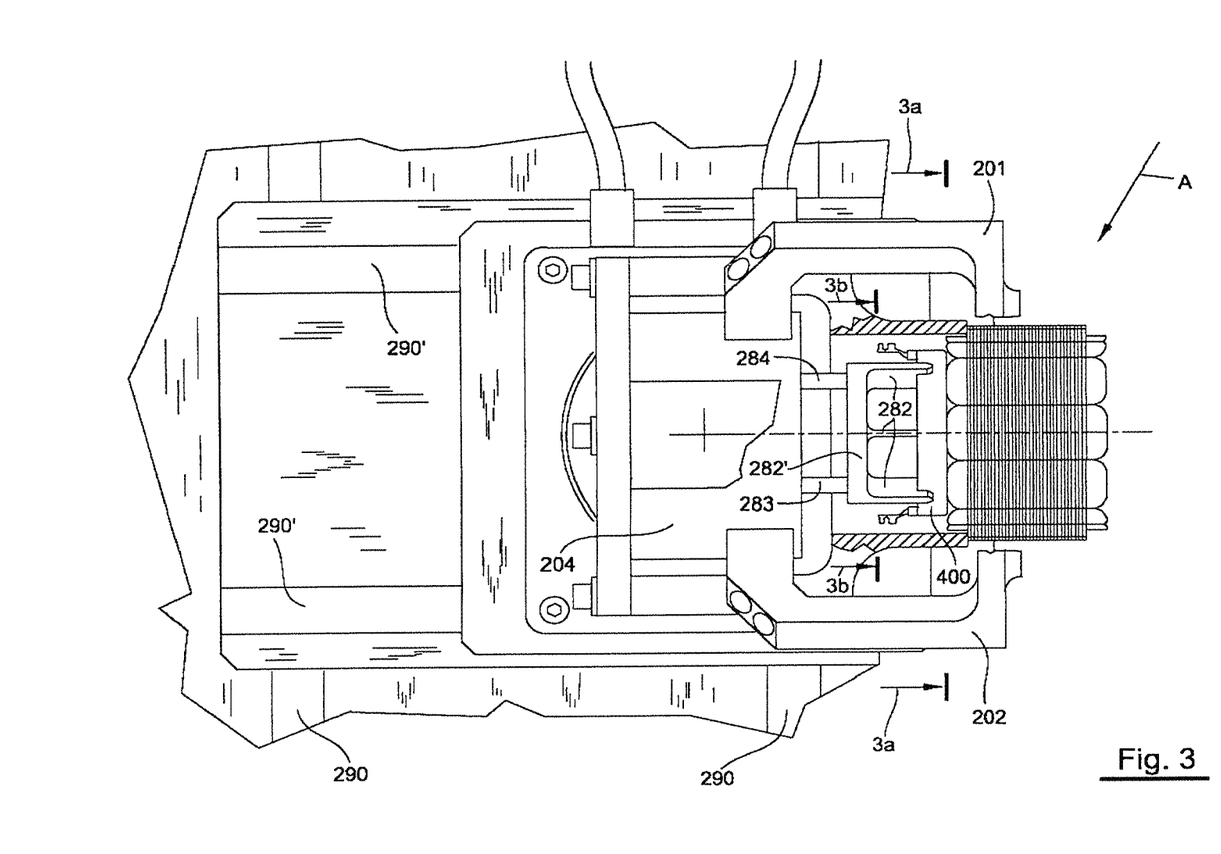
FIG. 3 is a partial section view illustrating a portion of the transfer device of FIG. 2 rotated by 90°.
Figure 3A:
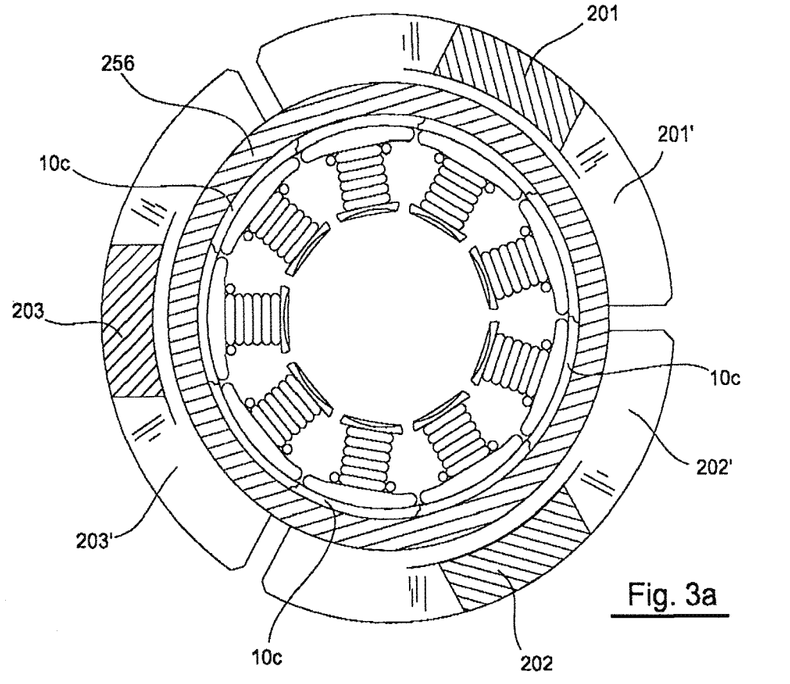
FIG. 3*a* is a section view as seen from directions 3*a*-3*a* of FIG. 3.

Once ends 10c have been referenced as described above, clamping members 201, 202 and 203 can be radially moved by drive 204 to engage portions 202',203' and 204' of the clamping members with the pole segments and in order to hold the pole segments in the reference position (see FIGS. 3 and 3a). This also maintains the pole segments assembled together due to the generation of the force reactions FC along lateral sides 10e (see FIG. 1).

In the situation of FIG. 2, a guide assembly is provided placed along a translation path comprising moveable engagement members for centering the pole segments 11. For example, the moveable engagement members can foresee centering pliers 291 and 292 for assuring that pole segments 11 are in the correct engagement condition along lateral sides 10e. In fact, pliers 291 and 292 can be closed around the pole segments in order to engage the latter, and thereby center them, prior to the above mentioned movement achieved by engagement rods 252. Pliers 291 and 292 can be opened during the movement caused by engagement rods 252.

Figure 3B:
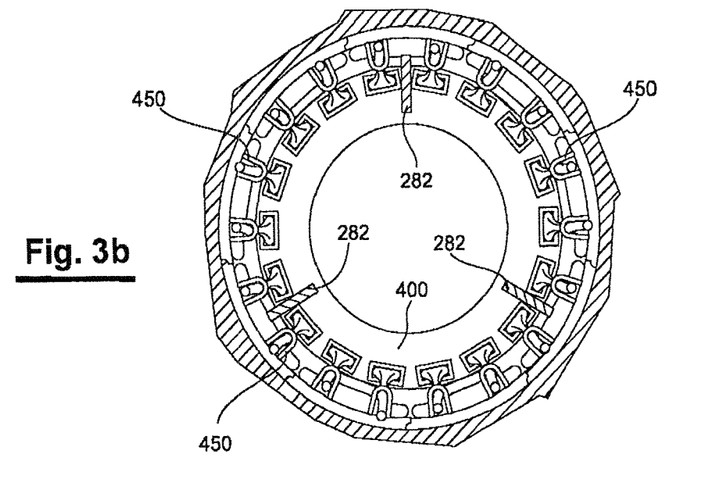
FIG. 3*b* is a section view as seen from directions 3*b*-3*b* of FIG. 2.

Transfer device 200 can also be provided with a fixing arrangement 280 for maintaining a lead support member 400 attached to the pole segments 11, as shown in FIGS. 2, 3 and 3b. In processing stages preceding the stage represented in FIG. 1, the lead support member 400 can be previously assembled adjacent to ends 10c of the pole segments 11 and there fixed, for example by a protuberance and socket arrangement (not shown in the figure). Lead support member 400 can be accidentally dislodged during transfer of the pole segments. To avoid this situation, fixing arrangement 280 provided with pusher arms 282 that press on lead support member 400 in a direction, which is towards ends 10c to maintain lead member 400 adjacent to end 10c.

Pusher arms 282 have a common portion 282', which is fixed to rods 283 and 284 (see FIGS. 2 and 3). Rods 283 and 284 can run in seats of the body of transfer device 200. Rods 283 and 284 can be pushed by preloaded springs, like 285, which are located in the seats of the body of transfer device 200, as shown in FIG. 2 for one of the springs.

Figure 5:
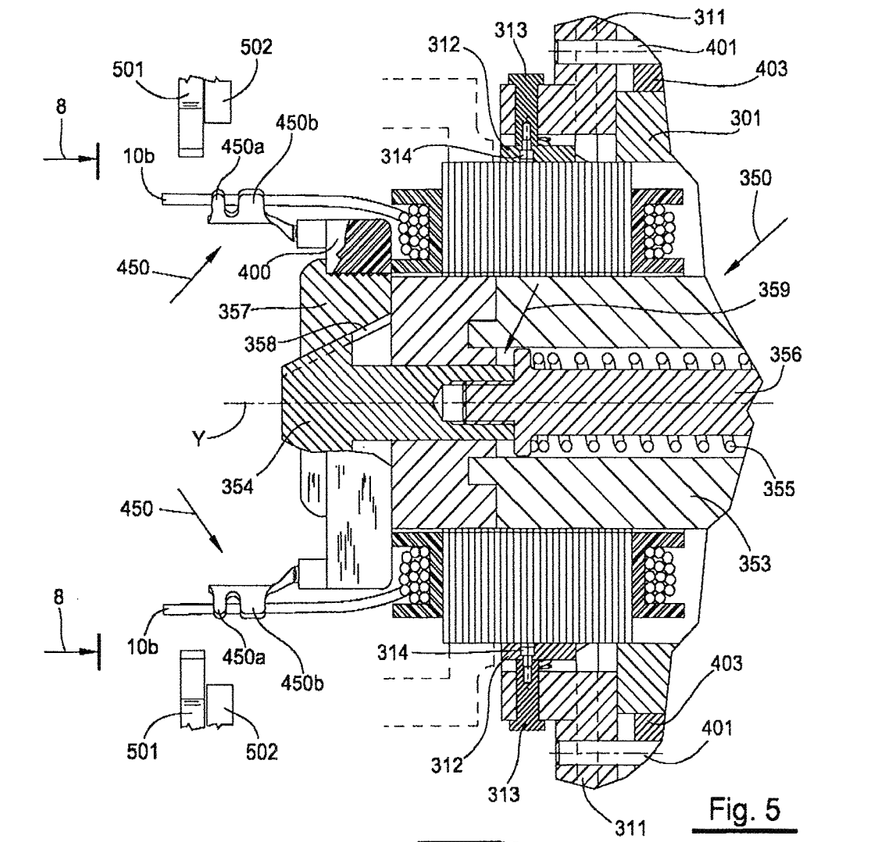
FIG. 5 illustrates a portion of FIG. 4 with certain parts shown in section.
Figure 8:
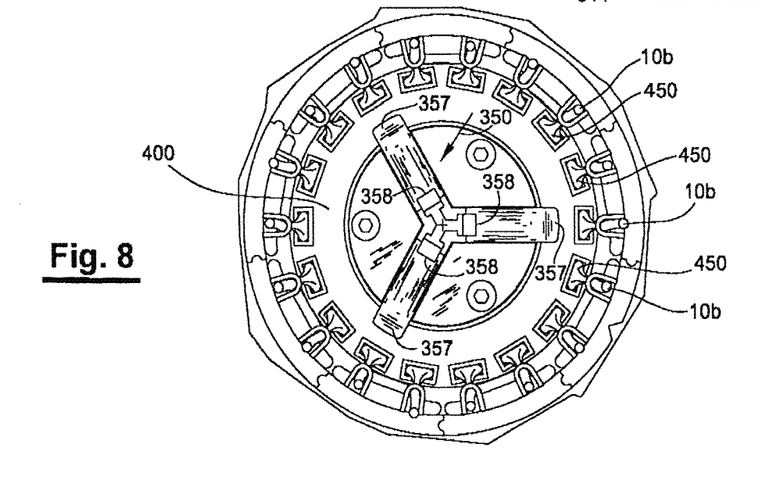
FIG. 8 is a view as seen from directions 8-8 of FIG. 5.

FIGS. 5 and 8 show that the lead support member 400 can be provided with terminals 450. Each terminal 450 can have a securing portion 450a for anchoring a lead 10b to the terminal 450. The lead 10b also passes in portion 450b, which resembles a sheath that surrounds lead 10b. For a terminal 450, portion 450a becomes crimped for anchoring the lead 10b to the terminal 450, whilst portion 450b becomes fused to create electrical contact, as will be described with more detail in the following.

A limited number of terminals 450 of the lead member 400 have been shown in FIG. 5, for reasons of clarity.

Transfer device 200 is assembled on guides 290 for being translated in direction X away from the condition shown in FIG. 2. Successively, transfer device 200 can be rotated for 90° by a rotation actuator 295 to reach the position shown in FIG. 3. In the position of FIG. 3, the assembly of pole segments 11 is held by clamping members 201, 202, 203 and results aligned with a containing assembly 300 (see FIGS. 3a and 4).

Transfer device 200 can translate towards the right of FIG. 3 on guides 290' in order to locate the assembly of pole segments 11 at containing assembly 300.

Containing assembly 300 is capable of receiving, holding, and if necessary transferring the pole segments 11 in the assembled arrangement. In particular, containing assembly 300 is capable of positioning the pole segments at processing stations. For example, the processing stations can consist in a station for definitely aligning a lead 10b with respect to portion 450a of terminal 450 and a station for fusing the lead 10b to portions 450b of the terminal. For reasons of clarity FIG. 4 does not show the condition where the assembly of pole segments 11 is received, however FIG. 5, which is an enlarged partial section view of FIG. 4, shows the assembly of pole segments 11 once received by containing assembly 300.

Figure 4:
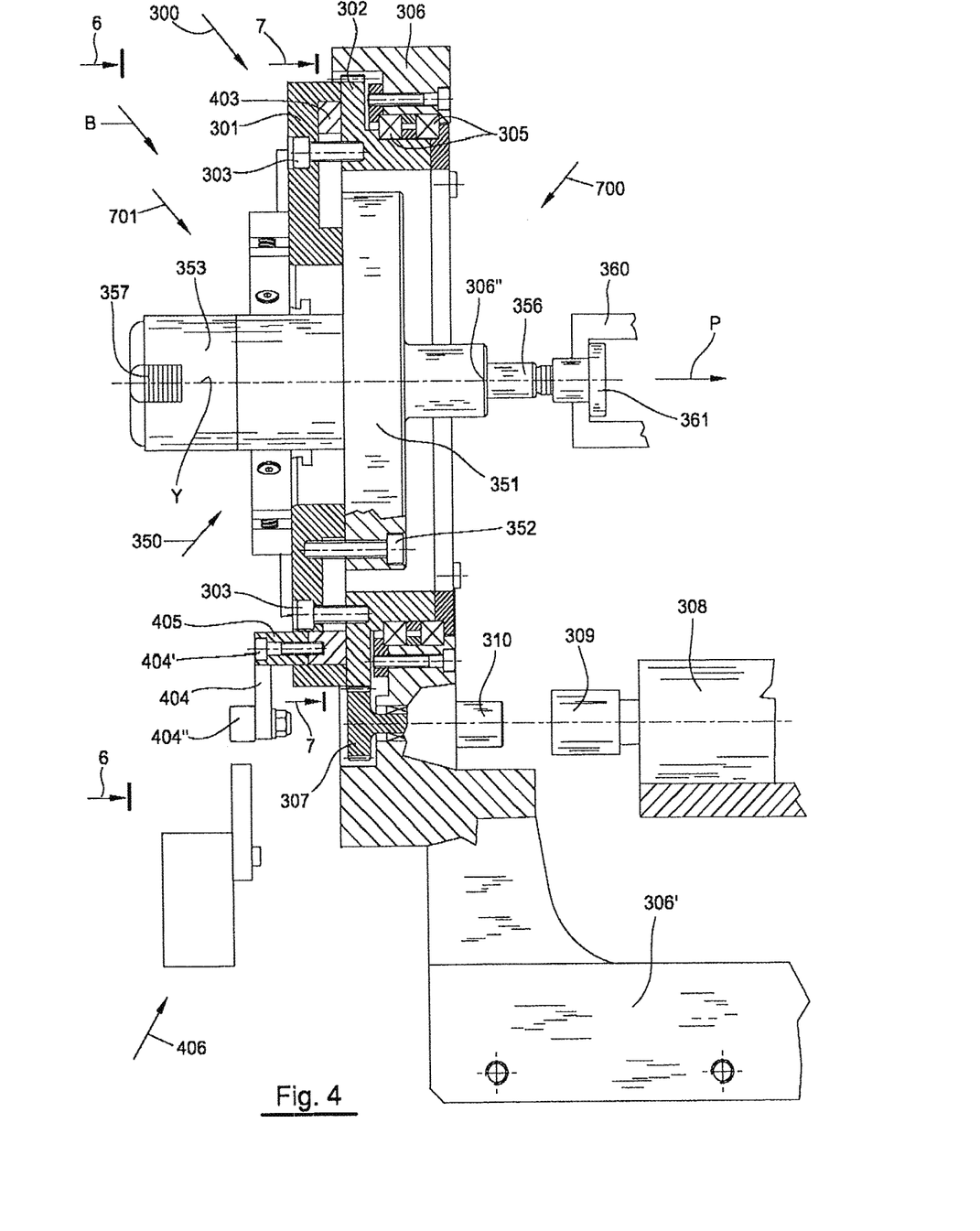
FIG. 4 is a partial section view of the transfer device illustrating a continuation on the right of FIG. 3.

Containing assembly 300 comprises a support ring 301 where the pole segments 11 are seated, as shown in FIGS. 4 and 5. Support ring 301 is bolted to gear ring 302 by means of bolts 303. Gear ring 302 is supported by bearings 305, which are seated on frame structure 306. Gear ring 302 is engaged with pinion gear 307, which is also seated in frame structure 306.

Drive 308 by means of coupling 309 becomes coupled to appendix 310 of pinion gear 307, so that pinion gear 307 can rotate gear ring 302, when the pole segments need to be angularly indexed around axis Y. Axis Y is a center axis of support ring 301, and is thus coincident with the center axis of the assembly of pole segments 11, when the latter is received in support ring 301 (see also FIG. 5).

Figure 6:
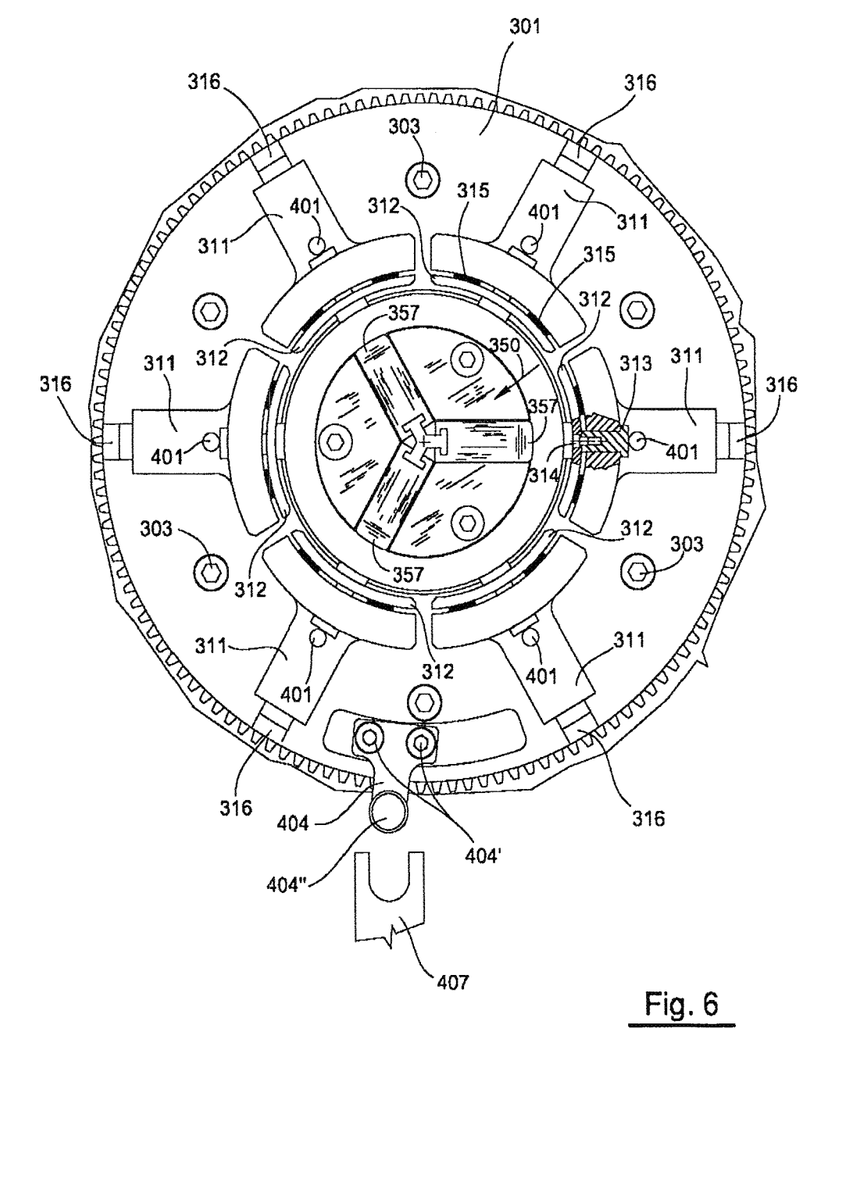
FIG. 6 is a view as seen from direction 6-6 of FIG. 4.

Movement members 311 are assembled on a face of support ring 301, as shown in FIGS. 4, 5 and 6. Each movement member 311 comprises a clamping member 312 having for example a circular shape, as shown in FIGS. 5 and 6.

The movement members 311 together with the clamping members 312, advantageously positioned on the containing assembly 300 so as to surround pole segments 11 have the task of clamping the pole segments 11 when the assembly of pole segments are received in support ring 301, as shown in FIG. 5.

The assembly of clamping pads 312 on clamping members 311 is achieved by means of joints which allow movement according to at least a degree of motion with respect movement member 313.

For example, the joints can comprise support pins 313 which pass through seats foreseen in the movement members 311, and bolts 314 for bolting the clamping members 312 to the movement members 311, as shown in FIGS. 5 and 6.

Springs 315 are interposed between the clamping pads 312 and the movement members 311. The support pins 313 are free to run in seats of the movement members 311, so that the clamping members 312 can perform compensation movements to adapt themselves to the surface of the pole segments when the movement members 311 are moved radially, i.e. towards axis Y, for a fixed stroke of a movement member 311. The radial movements of movement members 311 is guided by ways 316 present on the face of support ring 301.

A support assembly 350 for supporting lead support member 400 is shown in FIGS. 4 and 6, without being sectioned for reasons of clarity. Support assembly 350 is shown partially sectioned in FIG. 5.

In FIG. 5, lead support member 400 is shown supported by support assembly 350, according to the detail that will be more fully described in the following.

With reference to FIGS. 4 and 5, support assembly 350 comprises a fixing portion 351 fixed to support ring 301 by means of bolts 352. Support assembly 350 is provided with a central gripping portion 353, which extends from fixing portion 351.

With reference to FIGS. 4 and 5, central gripping portion 353 comprises gripper members 357, which move radially outwardly with respect to central axis Y to grip lead member 400 (see the condition of FIGS. 5 and 8 where lead support member 400 is gripped by gripping members 357). In particular, gripper members 357 are surrounded by movement members 311.

The radial movement of the gripper members 357 is caused by the axial movement along axis Y of cone member 354. Cone member 354 moves in this manner because it is pushed by preloaded spring 355. Preloaded spring 355 encircles shaft 356. Shaft 356 is connected to the cone member by a screw joint 359, as shown in FIG. 5. Spring 355 abuts the end of enclosure 306", shown in FIG. 4. Gripping members 357 are connected to cone member 354 by being engaged in ways of inclined guide 358, where each of the ways is configured like a T, as shown in FIGS. 5-8. The translation motion of cone member 354 along axis Y is transformed into outwards and inwards radial motion of gripping members 357 to release the grip on lead support member 400.

More particularly, as shown in FIG. 4, shaft 356 can be pulled in direction P by fork member 360 which engages head 361 of shaft 356. Accordingly, cone member 354 is caused to move in direction P to pull gripping members 357 inwardly and thereby release the grip on lead member 400.

The release of shaft 356 accomplished by moving fork member 360 in a direction opposite to direction P causes gripping members 357 to move radially outwards in order to grip lead support member 400, as shown for example in FIGS. 5 and 8. The preload of spring 355 maintains gripping members 357 in the radial position towards the outside to hold the lead support member 400 when the fork member 360 is disengaged from head 361. The disengagement of the fork member can be necessary in particular when the containing assembly 300 needs to be transferred.

Figure 7:
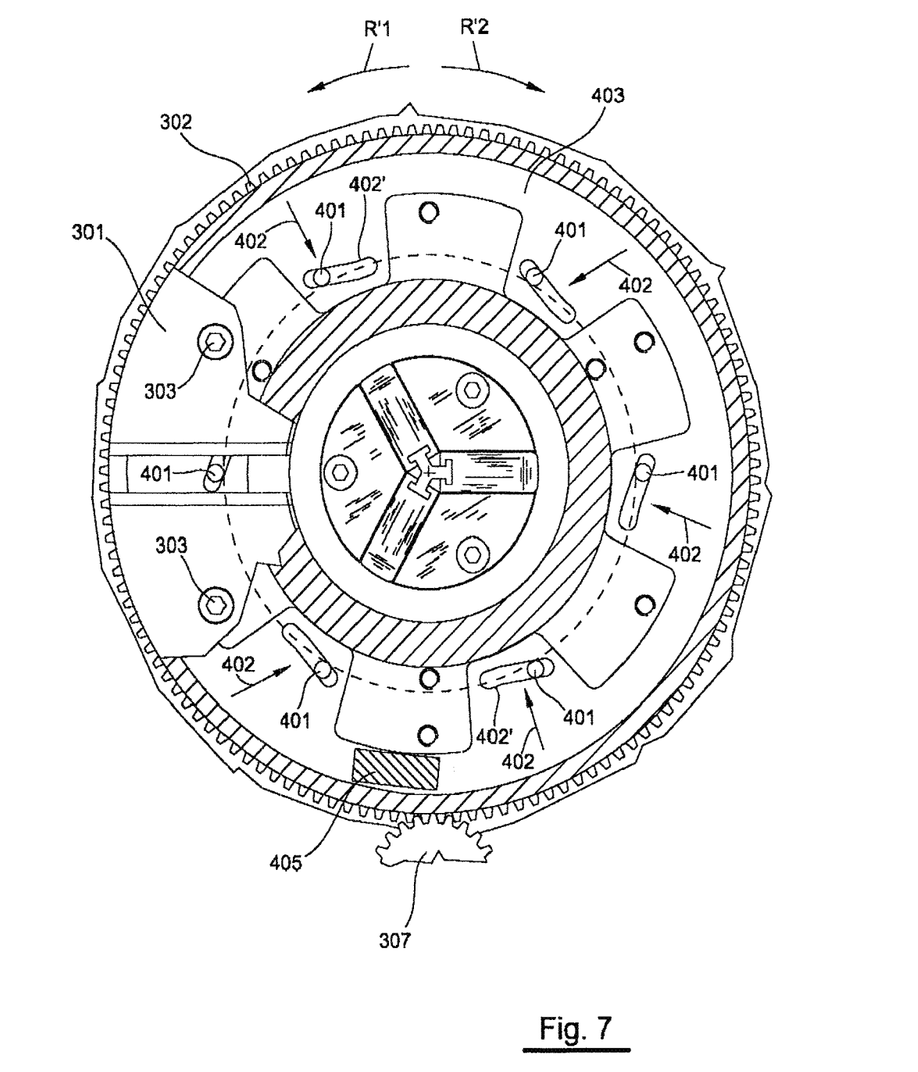
FIG. 7 is a partial section view as seen from directions 7-7 of FIG. 4.

FIG. 7 shows the mechanism for moving the movement members 311 and clamping pads 312 in the radial directions, i.e. towards or away from axis Y, to grip or release the pole segments 11, when the latter are positioned in the containing assembly 300.

More particularly, each movement member 311 is provided with a pin 401, which passes through a way 316 to engage the sides of respective cam slots 402 of ring 403. By rotating ring 403 in directions R'1 and R'2 around axis Y, movement members 311 are respectively moved towards axis Y for gripping the pole segments 11, or away from axis Y for releasing the clamping action on the pole segments 11. At ends 402' of cam slots 402 the profiles of the sides of the cam slots engaged by pins 401 are configured to maintain a locking action on pins 401. This causes locking of gripping members 311 in the gripping position of pole segments 11 (as shown in FIG. 5). The ends 402' are the ends of cam slots 402 in direction R'2 as shown in FIG. 7.

Ring 403 can be rotated in directions R1' and R2' by movement of arm 404 in directions R1' and R2' (see also FIG. 4). Arm 404 is fixed by bolts 404' to appendix 405 of cam ring 403, as shown in FIGS. 4, 6 and 7. Arm 404 is rotated in directions R1' and R2' by drive 406 (see FIGS. 4 and 6). Drive 406 can be a linear actuator having a fork member 407, which is caused to engage roller 404" of arm 404 to rotate ring 403 in directions R1' and R2', when required.

In particular, positioning and holding of the assembly of pole segments 11 on containing assembly 300 can be achieved by moving the clamping pads 312 radially towards axis Y, once the clamping members 201,202,203 have aligned the pole segments 11 with the clamping pads 312 placed in the release position. Then, the clamping pads 312 can be moved towards axis Y to grip the assembly of pole segments 11, as shown in FIG. 5. Successively, clamping members 201,202,203 can be opened to release the grip on the pole segments 11, and the transfer device 200 can be moved away from the containing assembly 300. Once this condition has been reached, the containing assembly 300 can be transferred to achieve that the assembly of pole segments 11 are processed.

In this sequence of positioning, gripping and transferring the assembly of pole segments 11, the lead support member 400 can be integral by means of the gripping members 357, once the clamping pads 312 are holding the pole segments 11.

The positioning of the assembly of pole segments 11 is predetermined. This has been achieved as a result of the transfer accomplished by transfer device 200 and the holding with the clamping pads 312. In particular, the assembly of pole segments 11 results positioned in a predetermined position along axis Y, and also radially with respect to axis Y in order to be centered. Furthermore, the various pole segment are positioned amongst themselves to in order to guarantee that the assembly of pole segments is not disrupted.

Figures 9, 9A:
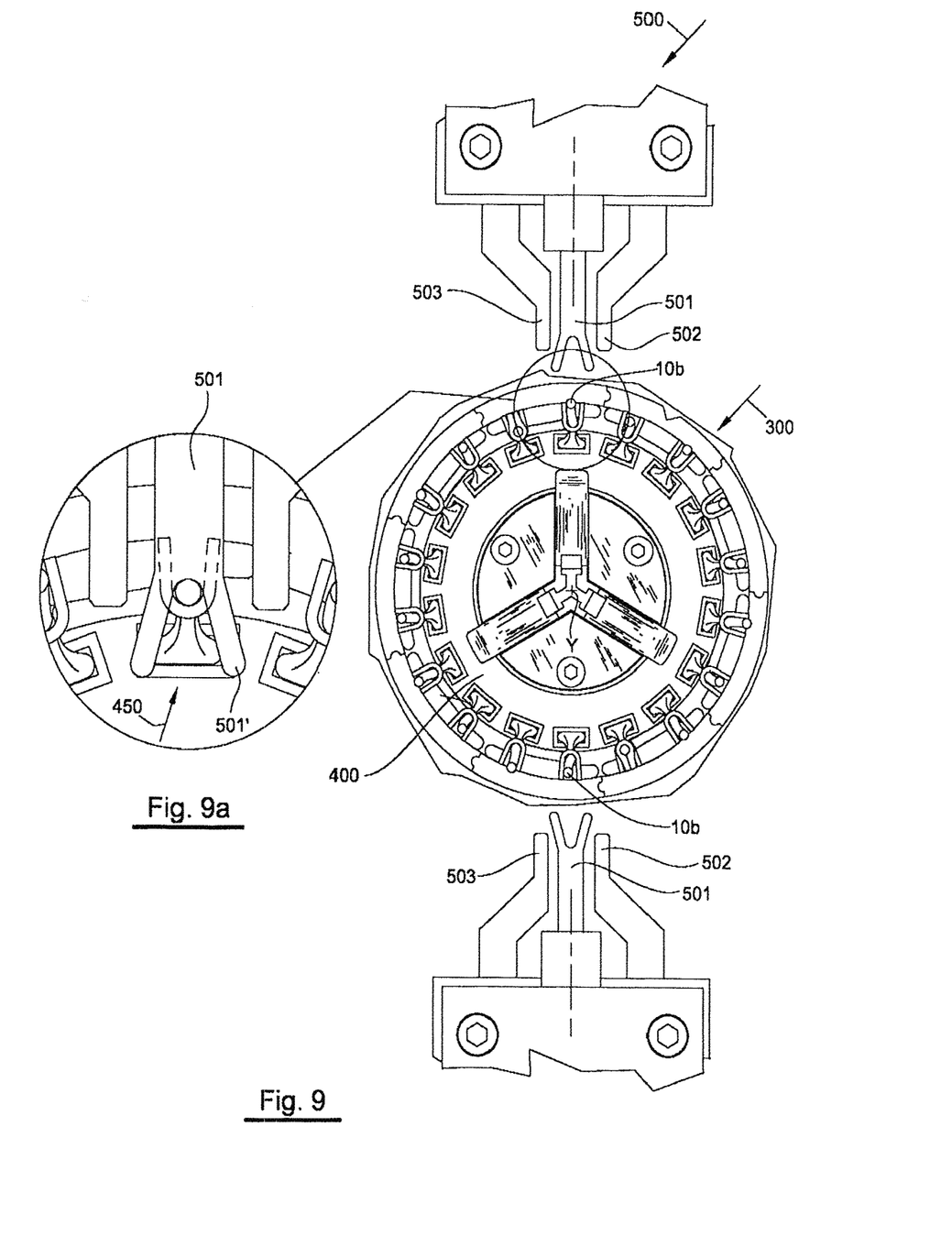
FIG. 9 is a view similar to the view of FIG. 8 illustrating a station where coil leads are positioned and terminals of the stator are crimped.
FIG. 9*a* is an enlargement of a portion of FIG. 9 illustrating a stage of positioning of the coil leads of the stator.

FIG. 9 shows a station 500 where a containing assembly 300 can be moved by translation or by rotation of portion 306' of frame structure 306 (see also FIG. 4).

At station 500, deflectors 501 can be moved in a radial direction to engage leads 10b and push leads 10b to move to their definite location in terminals 450.

Merely for reasons of illustration and clarity, FIG. 5 shows a side view of deflectors 501 aligned with terminals 450, even though the position of station 500 has been described as being separated from the location of the representation of FIG. 5, where the assembly of pole segments 11 are received from transfer device 200.

FIG. 9a shows the situation where the enlarged portion 501' of a deflector 501 pushes a lead 10b to the bottom of a terminal 450, as is the condition required for fusing. Successively clamping members 502 and 503 can crimp the sides of portion 450a of the terminal to secure the lead 10b (see also FIG. 5). The crimping of terminal portion 450a occurs by moving clamping member 502 and 503 towards each other with the terminal portion 450a positioned in between until the required crimping condition is achieved, as shown for certain terminals 450 of FIG. 9.

Similarly, in FIG. 5 also a side view of clamping member 502 aligned with terminals 450 has been shown.

In the station 500 of FIG. 9, two units having deflectors 501 and clamping member 502 and 503 are present. The units are positioned opposite to each other to be able to operate simultaneously, as has been described above for deflectors 501 and clamping members 502 and 503. The pole segments 11 and the lead member 450 are rotated around axis Y to position each terminal in a predetermined angular position with respect to the deflectors 501 and clamping members 502 and 503. The rotation for indexing can occur by actuating drive 308 of FIG. 4, which is present in station 500.

Figures 10, 10A:
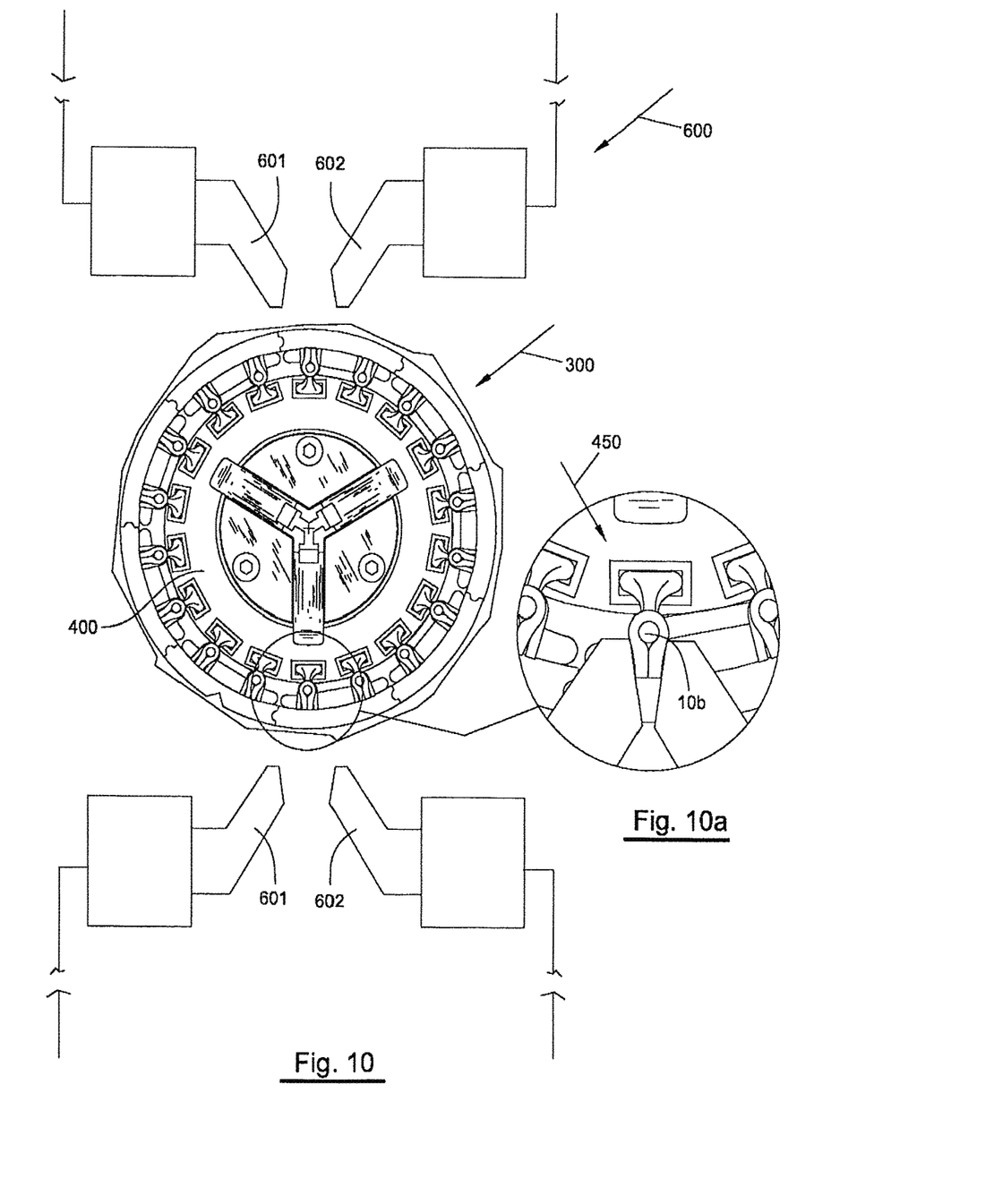
FIG. 10 is a view similar to the view of FIG. 8 illustrating a station where the terminals are fused.
FIG. 10*a* is an enlargement of a portion of figure illustrating a specific operating stage of fusing of the terminals.

FIG. 10 shows a fusing station 600 where the containing assembly 300 can be moved by translation, or rotation of portion 306' of frame structure 306 (see FIG. 4). At station 600, electrodes 601 and 602 clamp and apply heat to portion 450b of the terminal (see FIGS. 5 and 10a) in order to produce a fused contact of the leads 10b with the terminal 450. In the station of FIG. 600, two fusing units having electrodes 601 and 602 are present. The two units are positioned opposite to each other to be able to operate simultaneously in the manner that has been described above for electrodes 601 and 602. The pole segments 11 and the lead support member 400 are rotated around axis Y to position each terminal 450 in a predetermined angular position with respect to the electrodes 601 and 602. The indexing can occur by actuating drive 308 of FIG. 4, which would be present in station 600.

Referencing of the poles like has been described using ends 10c is required for guaranteeing predetermined positioning of the pole segments 11 with respect to any tooling or machine operator that needs to act on the assembly of pole segments, or on other members that are connected to the pole segments. Examples in this respect are the operators 501, 502, 503, and the electrodes 601 and 602 of the fusing station 600, which need to act on the leads and the terminals.

In another embodiment, lead support member 400 can be applied to the assembly of pole segments when the latter is present in containing assembly 300. In this case, a lead manipulator can place the leads 10b in the terminals, or the leads 10b can be placed in the terminals 450, as a result of the alignment and placement of the lead support member 400 on the assembly of pole segments 11.

A further embodiment for referencing the pole segments can foresee an engagement assembly 250, provided with engagement members 252 in the form of rods, like are shown in FIG. 2a. This engagement assembly would be present in area 700 of FIG. 4. The engagement members can engage ends 10*d'* of the pole segments 11, when the latter are positioned on clamping pads 312, and prior to being clamped with clamping pads 312. An end ring like 256 of FIGS. 2 and 3 can be positioned coaxial to axis Y on side 701 to act as an abutment surface when the pole segments are moved parallel to axis Y of the containing assembly 300. In this embodiment, at transfer device 200 and with respect to seat 12, it is sufficient to have an engagement assembly with a common base like 251, which engages the pole segments 11 in 10*d'* and lifts the pole segments 11 from seat 12.

When processing of the assembly of pole segments has been terminated with the use of containing assembly 300, the assembly of pole segments can be removed from clamping pads 312 by using clamping members like 201, 202, 203 of transfer device 200.

The foregoing description of an embodiment of the method and of the apparatus according to the invention will so fully reveal the invention according to the conceptual point of view so that other, by applying current knowledge, will be able to modify and/or adapt in various applications this specific embodiment without further research and without parting from the invention, and, accordingly, it is meant that such adaptations and modifications will have to be considered as equivalent to the exemplified specific embodiment. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A method for manufacturing stators of dynamoelectric machines using an apparatus having a seat, a moveable transfer device including a first holding assembly comprising a first plurality of holding members, an engagement assembly comprising a plurality of engagement members aligned with the seat, and a containing assembly including a second holding assembly comprising a second plurality of holding members, the stators being formed as an assembly of pole segments, the method comprising:

seating the assembly of pole segments in the seat;

engaging a first end of each pole segment of the assembly of pole segments with a respective engagement member of the engagement assembly for translation of the pole segments from the seat to the transfer device;

translating the assembly of pole segments from the seat to the transfer device;

clamping the pole segments as an assembly of pole segments with the first holding assembly;

transferring the assembly of pole segments, using the transfer device, from a first position proximate to the seat to a second position proximate to the containing assembly; and holding the assembly of pole segments in a predetermined position at the containing assembly with the second holding assembly, the second holding assembly being positioned on the containing assembly for maintaining the assembly of pole segments in the predetermined position.

2. The method of claim 1 further comprising engaging ends of the pole segments against a reference surface to align the ends of the pole segments.

3. The method of claim 2 further comprising using a plurality of engagement members and engaging each engaging member with a specific pole segment to move the pole segments towards the reference surface.

4. The method of claim 1 further comprising:

providing the assembly of pole segments with a support member having terminals for connection of leads of coils of the pole segments; and pushing on the support member to maintain the support member in a constant position with respect to the assembly of pole segments.

5. The method of claim 4, wherein pushing on the support member occurs at a first position, the method further comprising rotating or translating the casing containing assembly to a second position.

6. The method of claim 4 further comprising crimping the terminals around the leads of coils.

7. The method of claim 4 further comprising fusing the leads of coils to terminals.

8. The method of claim 1, wherein the containing assembly further comprises a third holding assembly comprising a third plurality of holding members for holding a support member, the method further comprising arranging the third plurality of holding members to be surrounded by the second plurality of holding members.

9. The method of claim 1 further comprising pushing leads of coils of pole segments into predetermined positions of terminals of the assembly of pole segments.

\* \* \* \* \*

UNITED STATES PATENT AND TRADEMARK OFFICE
CERTIFICATE OF CORRECTION

| | | |
|---|---|---|
| PATENT NO. | : 10,804,775 B2 | Page 1 of 1 |
| APPLICATION NO. | : 16/030010 | |
| DATED | : October 13, 2020 | |
| INVENTOR(S) | : Massimo Ponzio et al. | |

It is certified that error appears in the above-identified patent and that said Letters Patent is hereby corrected as shown below:

In the Claims

Claim 5, Column 10, Line 31, "casing" should be deleted.

Signed and Sealed this
Fifteenth Day of December, 2020

Andrei Iancu
*Director of the United States Patent and Trademark Office*